Feb. 2, 1926.
F. G. KRAKAN
1,571,451
AUTOMOBILE SPRING DEVICE
Filed March 7, 1925    2 Sheets-Sheet 1
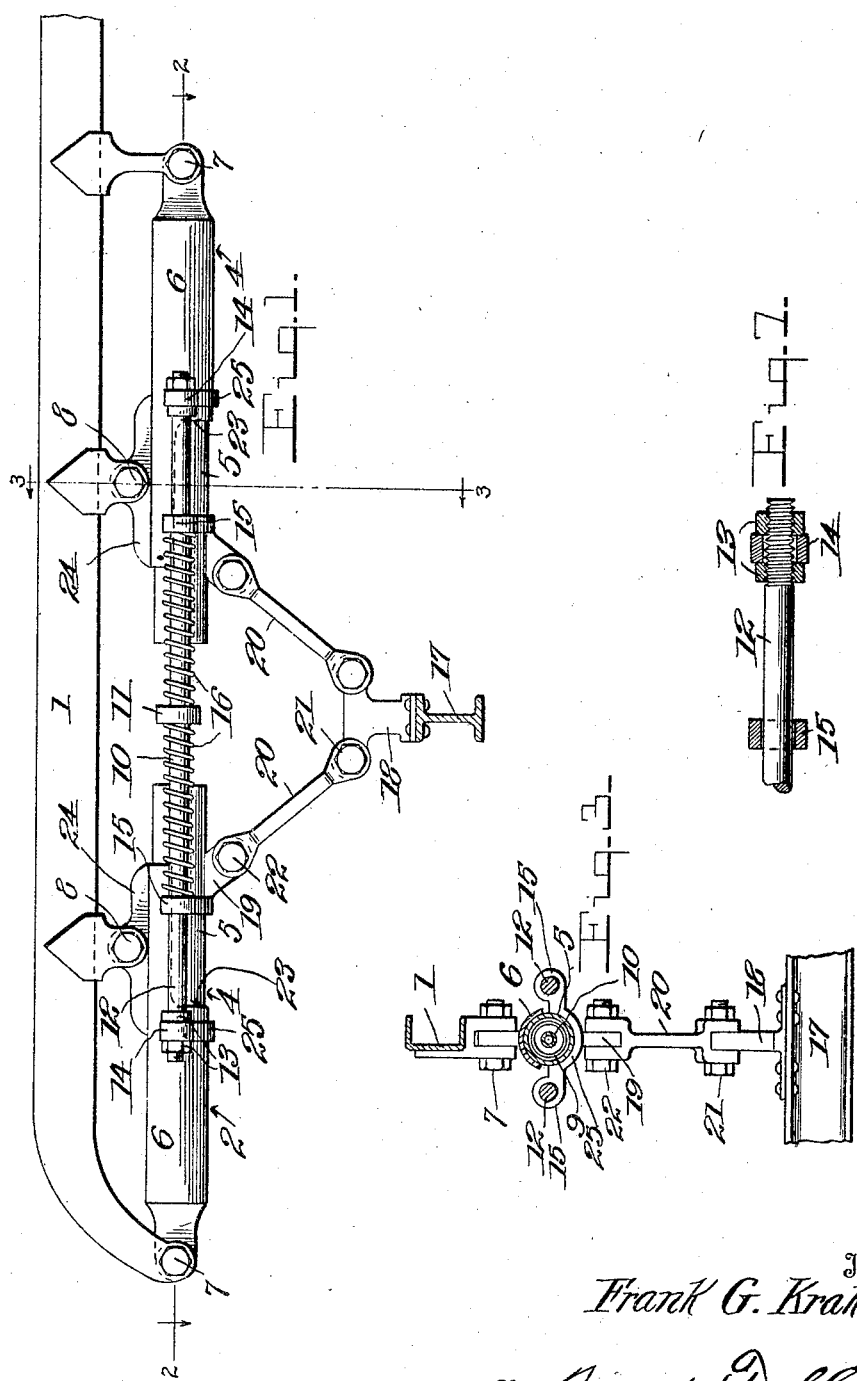
Inventor,
Frank G. Krakan,
By Frank Fuller
Attorney.

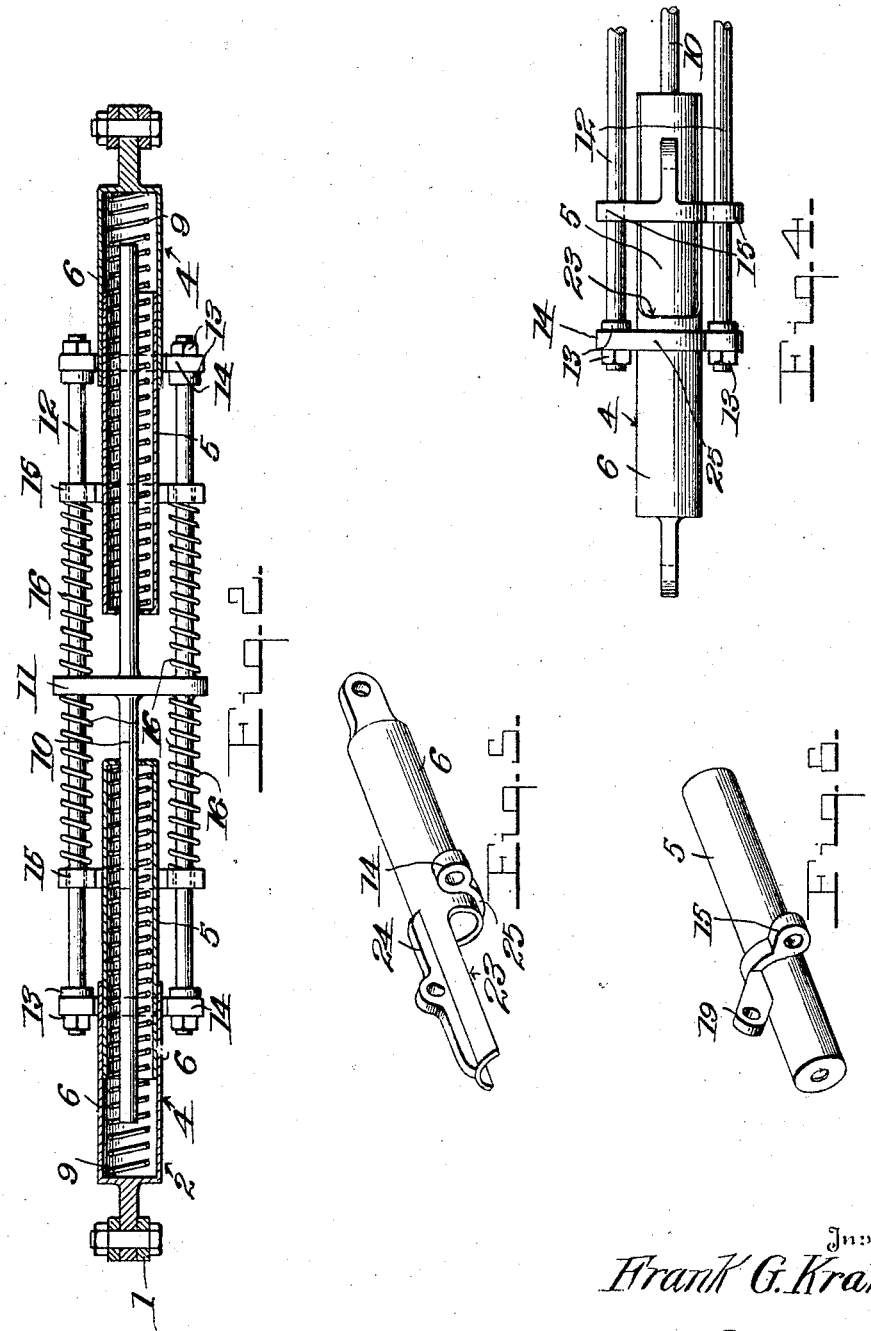

Patented Feb. 2, 1926.

1,571,451

UNITED STATES PATENT OFFICE.

FRANK G. KRAKAN, OF PITTSBURGH, PENNSYLVANIA.

AUTOMOBILE SPRING DEVICE.

Application filed March 7, 1925. Serial No. 13,795.

*To all whom it may concern:*

Be it known that FRANK G. KRAKAN, a citizen of the United States, residing at Pittsburgh, in the county of Allegheny and State of Pennsylvania, has invented certain new and useful Improvements in Automobile Spring Devices, of which the following is a specification.

This invention relates to an automobile spring and constitutes an improvement of the construction disclosed in my Patent No. 1,461,274, issued July 10, 1923.

The general aim of the present invention is to simplify said construction and produce one which has less parts, will operate more efficiently, may be manufactured at less cost, and which particularly avoids a connection centrally of and above the cushioning cylinders to the chassis of the automobile.

The more specific objects and advantages will become apparent from a consideration of the description following taken in connection with accompanying drawings illustrating an operative embodiment.

In said drawings:—

Figure 1 is a view particularly illustrating the invention in side elevation;

Figures 2 and 3 are sectional views taken respectively on the lines 2—2 and 3—3 of Figure 1;

Figure 4 is an inverted plan view of one of the cushioning cylinders and associated parts;

Figures 5 and 6 are detail perspective views, respectively of the fixed and movable sections of the cushioning devices, and Figure 7 is a detail of the connection of one of the side rods to the cushioning devices.

Referring specifically to the drawings, 1 represents one end of a side beam of an automobile chassis and 2 generally designates a cushioning device used in place of the usual laminated spring. It is to be understood that this structure is used at each of the ends of the two side beams or otherwise of the automobile.

Each structure of the present invention comprises cushioning devices 4 which have inner and outer telescopic cylinders 5 and 6, the former being slidable and the latter fixed to the beam 1, preferably detachably, by means of bolts at 7 and 8. Inner cylinders 6 also slide along a center rod 10 which has a transverse bar 11 rigid therewith and located midway of its ends. Expansive springs 9 are located within the cylinders 5 and 6. Side rods 11 and 12 are detachably fastened by nuts 13 in lugs 14 rigid with the cylinders 6 and pass removably through the bar 11 and through lugs 15 rigid on cylinders 5 so that the lugs 15 may slide and guide the cylinders 5 on the side rods. Expansive springs 16 are removably disposed on the side rods and abut the bar 11 and the respective lugs 15.

A vehicle axle is suggested at 17 and connection is made between the same and the slidable cylinders 5. To this end a bracket 18 is fastened to said axle 17 and lugs 19 are formed integral with cylinders 5. Links 20 arranged in upwardly diverging relation are pivoted at 21 to bracket 18 and at 22 to lugs 19. The cylinders 6 are cut away at 23 to accommodate movement of ears 15 and adjacent the same is reinforced by a longitudinal rib 24 integral therewith through which the bolts 8 pass and by a transverse rib 25 whose terminals are formed into the lugs 14.

In use, as the side beam 1 or chassis moves relatively to the axle 17, the links 20 tend to straighten toward the horizontal and thus move the cylinders 5 against the tension of springs 9. The rebound is checked or cushioned by the action of ears 23 against the springs 16.

Various changes may be resorted to provided they fall within the spirit and scope of the invention.

I claim as my invention:—

1. A spring of the class described having fixed cylinders, slidable cylinders telescoped therein, compression springs in said cylinders, a rod along which the slidable cylinders move, side rods, means on the slidable cylinders movable along said side rods, and compression springs on said side rods engaging the first rods and engageable by said means.

2. A spring of the class described having fixed cylinders, slidable cylinders telescoped therewith, compression springs in said cylinders, a rod along which the slidable cylinders move, said rod between the slidable cylinders having a transverse bar, side rods passing through said bar, means securing said side bars against movement, lugs on the slidable cylinders slidable along said rods, and compression springs on said side rods engageable by said bar and said lugs.

3. A spring of the class described having fixed cylinders, slidable cylinders telescoped therewith, compression springs in said cylinders, a rod along which the slidable cylinders move, said rod between the slidable cylinders having a transverse bar, side rods passing through said bar, lugs on the fixed cylinders, means to detachably secure said rod to said lug, lugs on the slidable cylinders slidable along the side rods, and compression springs on said side rods engageable by said bar and the second mentioned lugs.

4. A spring of the class described having fixed cylinders, slidable cylinders telescoped therewith, compression springs in said cylinders, a rod along which the slidable cylinders move, said rod between the slidable cylinders having a transverse bar, side rods passing through said bar, lugs on the fixed cylinders, means detachably securing said rod to said lugs, lugs on the slidable cylinders slidable along the side rods, and compression springs on said side rods engageable by said bar and the second mentioned lugs, the fixed cylinders being outermost and cutaway to accommodate movement of the second mentioned lugs, the lugs of the fixed cylinders reinforcing the same adjacent the cutaway portion, and longitudinally extending attaching rods on the cutaway portions to reinforce the same.

In testimony whereof I affix my signature.

FRANK G. KRAKAN.